United States Patent
Matsubara et al.

(10) Patent No.: US 7,198,025 B2
(45) Date of Patent: Apr. 3, 2007

(54) IN-CYLINDER INJECTION TYPE SPARK-IGNITION INTERNAL COMBUSTION ENGINE

(75) Inventors: Joji Matsubara, Seto (JP); Tadakuni Takeda, Anjo (JP); Kazuyoshi Nakane, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/400,308

(22) Filed: Apr. 10, 2006

(65) Prior Publication Data

US 2006/0231063 A1    Oct. 19, 2006

(30) Foreign Application Priority Data

Apr. 18, 2005    (JP)    ............................. 2005-119698

(51) Int. Cl.
*F02B 5/00*    (2006.01)
*F02B 5/02*    (2006.01)

(52) U.S. Cl. ....................... 123/305; 123/295

(58) Field of Classification Search ................ 123/295, 123/305, 301, 430, 478
See application file for complete search history.

(56) References Cited

U.S. PATENT DOCUMENTS 6,062,190 A * 5/2000 Nakajima ................... 123/295
6,089,206 A * 7/2000 Suzuki et al. ............... 123/295
6,176,227 B1 * 1/2001 Ohuchi et al. ............... 123/698

FOREIGN PATENT DOCUMENTS

JP    11-210472 A    8/1999

* cited by examiner

*Primary Examiner*—Mahmoud Gimie
(74) *Attorney, Agent, or Firm*—Birch, Stewart, Kolasch & Birch, LLP

(57) ABSTRACT

When, in a coexistence region where stratified combustion by a spray-guide method (SG combustion) and stratified combustion by a wall-guide method (WG combustion) are both practicable, a change from the SG combustion to the WG combustion is carried out, an ECU obtains point b giving a set of a fuel injection timing and an ignition timing capable of achieving the same target torque as a target torque in the SG combustion before the change, by the WG combustion, and changes the fuel injection timing and ignition timing stepwise from point a within an SG region to point b within a WG region, jumping across a misfire region, and then continuously to point c giving an optimal set of a fuel injection timing and an ignition timing corresponding to an MBT.

5 Claims, 4 Drawing Sheets

IN-CYLINDER INJECTION TYPE SPARK-IGNITION INTERNAL COMBUSTION ENGINE

BACKGROUND OF THE INVENTION

1. Field of the Invention

This invention relates to an in-cylinder injection type spark-ignition internal combustion engine in which fuel is injected directly into a combustion chamber and ignited by a spark plug.

2. Description of the Related Art

In the in-cylinder injection type spark-ignition internal combustion engine in which fuel is injected directly into a combustion chamber, stratified lean combustion can be carried out, where ignition is made at an overall very lean air/fuel ratio, for example, by transferring fuel spray injected by a fuel injection valve in the compression stoke to near an electrode part of a spark plug, and thereby forming a mixture having an air/fuel ratio close to the stoichiometric air/fuel ratio around the electrode part of the spark plug. There are various manners of transferring the fuel spray to near the electrode part of the spark plug. An internal combustion engine arranged such that a change between different manners of transferring the fuel spray (hereinafter referred to as "spray transfer modes") is carried out depending on the operational conditions of the engine has been proposed by Japanese Unexamined Patent Publication No. Hei 11-210472 (hereinafter referred to as "patent document 1"), for example.

In the technique disclosed in patent document 1, a fuel injection valve is arranged in an almost vertical position at the top of a combustion chamber, a spark plug is arranged with its electrode part located near and facing the injection hole part of the fuel injection valve, and a cavity is formed in the top face of a piston. When the engine is in a low engine-load operational region, stratified combustion is carried out by a so-called spray-guide method, in which, by retarding the fuel injection timing to be close to the ignition timing, it is arranged that ignition is made at the time when the fuel spray from the fuel injection valve arrives near the electrode part of the spark plug on its own kinetic energy. Meanwhile, when the engine is in a high engine-load operational region, stratified combustion is carried out by a so-called wall-guide method, in which, by advancing the fuel injection timing, it is arranged that the fuel spray is transferred to near the electrode part of the spark plug with the help of a tumbling flow produced by the cavity of the piston and ignited.

In order to change the spray transfer mode depending on the load on the internal combustion engine as in the technique disclosed in patent document 1, it is necessary to change the fuel injection timing and ignition timing using a specified engine torque as a threshold. However, in the control using normal fuel injection timing maps and normal ignition timing maps, in order to prevent a step in torque due to an abrupt change in fuel injection timing and ignition timing, the fuel injection timing and ignition timing are changed continuously, by performing interpolation to the control maps. This causes a problem that at the time of changing a spray transfer mode, misfire occurs due to the following reasons:

FIG. 4 is a characteristic diagram which relates to a specified air/fuel ratio and shows, in respect of fuel injection timing Tij (horizontal axis) and ignition timing Tig (vertical axis), a region capable of achieving stable stratified combustion by the spray-guide method (SG region) and a region capable of achieving stable stratified combustion by the wall-guide method (WG region). FIG. 4 shows that at this air/fuel ratio, the SG region and the WG region are independent of each other, with a misfire region between them. Hence, if the fuel injection timing Tij and ignition time Tig are changed continuously by interpolation as mentioned above, there can be cases where the fuel injection timing and ignition time stay long in the misfire region so that misfire continues. In order to avoid this situation, a spray transfer mode needs to be changed depending on the engine load, however, the change of the mode cannot be carried out. Thus, the merits of both fuel transfer modes, such as improvement in fuel economy and reduction in NOx for example, cannot be fully utilized.

SUMMARY OF THE INVENTION

An aspect of the present invention is an in-cylinder injection type spark-ignition internal combustion engine comprising a fuel injection valve for injecting fuel directly into a combustion chamber; a spark plug with an electrode part located near a path of fuel spray injected by the fuel injection valve; a piston arranged to be able to turn back the fuel spray which has passed by the electrode part of the spark plug so that the fuel spray is transferred again to near the electrode part; a mode change determination means for determining whether to carry out a change between stratified combustion in a first spray transfer mode in which ignition is made at the time when the fuel spray injected by the fuel injection valve passes by the electrode part of the spark plug, and stratified combustion in a second spray transfer mode in which ignition is made at the time when the fuel spray which has passed by the electrode part is transferred again to near the electrode part by the piston turning the fuel spray back, in a coexistence operational region where stratified combustion in the first spray transfer mode and stratified combustion in the second spray transfer mode are both practicable; an injection timing and ignition timing calculation means for, when the mode change determination means determines to change the spray transfer mode, calculating a set of a fuel injection timing and an ignition timing capable of achieving almost the same engine torque as a torque produced by the internal combustion engine before the change, by stratified combustion in the spray transfer mode after the change; and a spray transfer mode change means for, when the mode change determination means determines to change the spray transfer mode, stepwise changing the fuel injection timing and ignition timing for the internal combustion engine, on the basis of the result of calculation by the injection timing and ignition timing calculation means.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

An in-cylinder injection type spark-ignition internal combustion engine in an embodiment of this invention will be described below.

Figure 1:
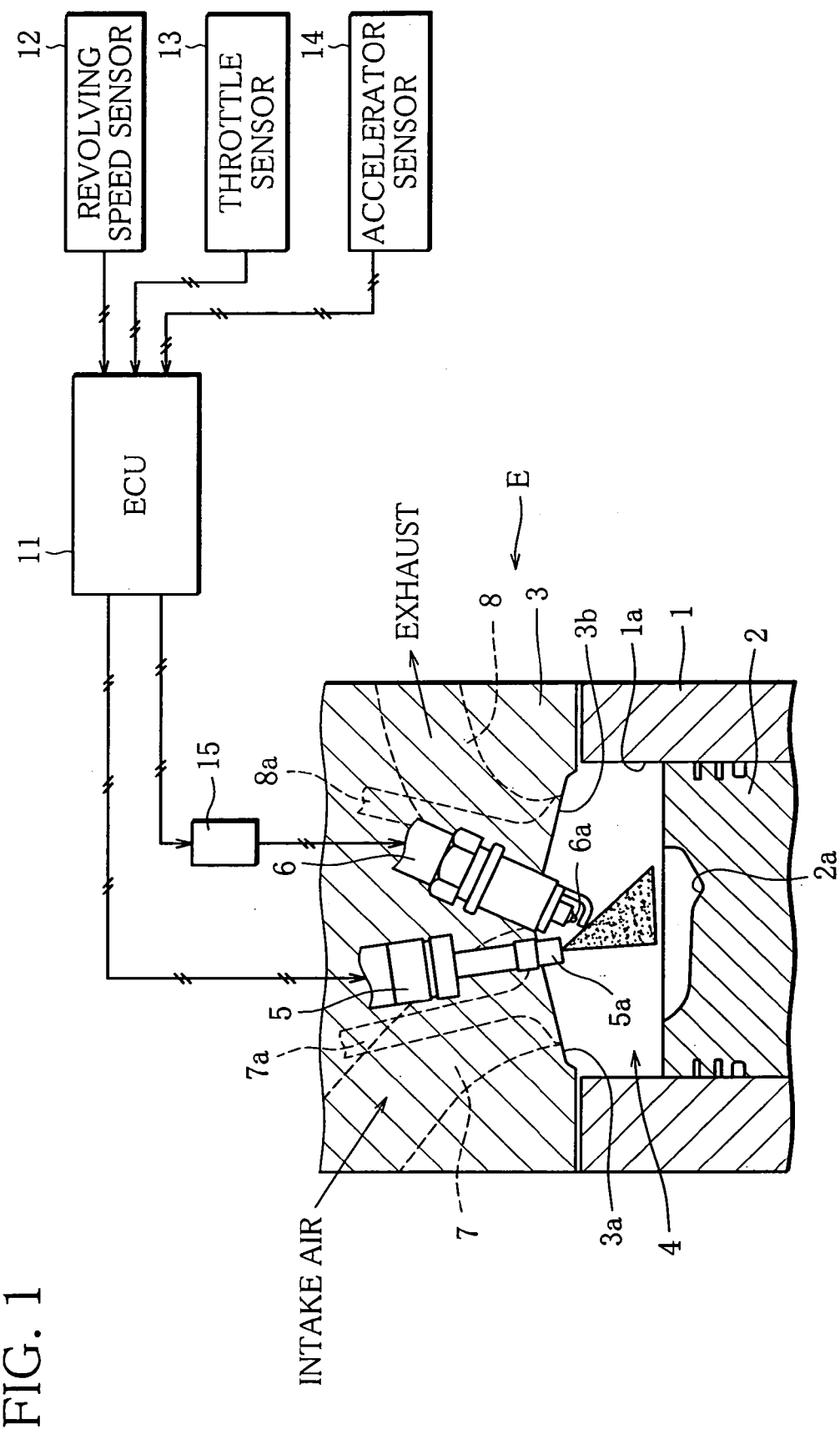
FIG. 1 is a diagram showing the schematic structure of an in-cylinder injection type spark-ignition internal combustion engine in an embodiment of this invention.

FIG. 1 is a diagram showing the schematic structure of an in-cylinder injection type spark-ignition internal combustion engine in an embodiment of this invention. The internal combustion engine in this embodiment is formed as an in-line four-cylinder engine. The drawing relates to one of the cylinders, and the other cylinders have the identical structure.

Within a cylinder 1a formed in a cylinder block 1 of an internal combustion engine E, a piston 2 is fitted to be able to slide up and down. A cylinder head 3 is fixed on the cylinder block 1. The undersurface of the cylinder head 3 is formed to include paired sloping surfaces 3a, 3b which slope down to the intake side (left side in FIG. 1) and to the exhaust side (right side in FIG. 1) of the internal combustion engine E, respectively. The sloping surfaces 3a, 3b, the inner surface of the cylinder 1a and the top face of the piston 2 define a so-called pent-roof combustion chamber 4. A cavity 2a is formed in the piston top face. The cavity 2a has an optimal shape to turn the intake air flowing into the combustion chamber 4, back upward within the cavity 2a to produce a tumbling flow.

A fuel injection valve 5 is fitted to the cylinder head 3, at a location a little to the intake side, relative to the ridge formed where the sloping surfaces 3a, 3b meet. The fuel injection valve 5 is held in an almost vertical but slightly sloping position such that its upper end is located a little more to the intake side than its lower end, where an injection hole part 5a at the lower end faces the interior of the combustion chamber 4 so that fuel can be injected into the combustion chamber 4. Further, a spark plug 6 is fitted to the cylinder head 3, at a location a little to the exhaust side, relative to the ridge between the sloping surfaces 3a, 3b. The spark plug 3 is held in an almost vertical but slightly sloping position such that its upper end is located a little more to the exhaust side than its lower end, where an electrode part 6a at the lower end faces the interior of the combustion chamber 4.

Due to this positional relation between the fuel injection valve 5 and the spark plug 6, the injection hole part 5a of the fuel injection valve 5 and the electrode part 6a of the spark plug 6 are close to each other within the combustion chamber 4, and fuel spray injected through the injection hole part 5a passes by (directly under) the electrode part 6a. The positional relation between the fuel spray transfer path and the electrode part 6a is not limited to this. It can be modified in any way, as long as a mixture can be ignited by a spray-guide method described later. For example, the electrode part 6a may be located in the fuel spray transfer path.

On the intake-side sloping surface 3a of the cylinder head 3, intake ports 7 are formed in a pair such that they are arranged in the front-to-back direction of the internal combustion engine E (direction perpendicular to the sheet), with the fuel injection valve 5 between. Likewise, on the exhaust-side sloping surface 3b of the cylinder head 3, exhaust ports 8 are formed in a pair such that they are arranged in the front-to-back direction, with the spark plug 6 between. An intake valve 7a is arranged in each intake port 7, while an exhaust valve 8a is arranged in each exhaust port 8. The intake valves 7a and exhaust valves 8a are driven to open and close at specified timing, in synchronization with the rotation of a crank shaft, by means of a valve driving mechanism (not shown) provided on the cylinder head 3.

Both intake ports 7 as well as the intake ports for the other cylinders are connected to a common intake passage (not shown). While the engine is in operation, intake air introduced into the intake passage is flow-controlled according to the opening of a throttle valve, then distributed to the respective cylinders, and flows into the combustion chamber 4 thorough both intake ports 7 as the intake valves 7a open. Meanwhile, both exhaust ports 8 as well as the exhaust ports for the other cylinders are connected to a common exhaust passage (not shown). While the engine is in operation, exhaust gas left after combustion in the combustion chamber 4 is discharged through both exhaust ports 8 to the exhaust passage as the exhaust valves 8a open, merges with exhaust gas from the other cylinders, passes through a catalytic converter and a silencer provided in the exhaust passage, and is discharged to the outside.

In the vehicle compartment is provided an ECU (electronic control unit) 11 including an input/output device, memory (ROM, RAM, etc.) used for storing control programs, control maps, etc., a central processing unit (CPU), a timer counter, etc., which are not shown. To the input side of the ECU 11 are connected various sensors, such as a revolving speed sensor 12 for detecting the revolving speed Ne of the internal combustion engine E, a throttle sensor 13 for detecting the throttle opening $\theta$th in the internal combustion engine E, and an accelerator sensor 14 for detecting the accelerator depression $\theta$acc. To the output side of the ECU 11 are connected various devices, such as the above-mentioned fuel injection valves 5, and igniters 15 for driving the respective spark plugs 6.

On the basis of fuel injection quantity maps, fuel injection timing maps and ignition timing maps prepared in advance, the ECU 11 sets the fuel injection quantity Q, fuel injection timing Tij and ignition timing Tig, depending on the engine revolving speed Ne, accelerator depression $\theta$acc, etc., controls the open period and opening timing for the fuel injection valve 5, on the basis of these target values, and controls the ignition timing for the ignition plug 6 by driving the igniter 15.

While in operation, the internal combustion engine E can be switched between homogeneous combustion and stratified combustion, depending on the target torque Tq obtained from the accelerator depression $\theta$acc, etc. and the engine revolving speed Ne. Specifically, when the internal combustion engine is in an operational region where the target torque Tq or the engine revolving speed Ne is relatively high, homogeneous combustion is carried out by injecting fuel in the intake stroke, thereby forming a homogeneous mixture and burning it. Meanwhile, when the internal combustion engine is in an operational region where the target torque Tq and the engine revolving speed Ne are relatively low, stratified combustion is carried out by injecting fuel in the compression stroke, thereby forming a mixture having an air/fuel ratio close to the stoichiometric air/fuel ratio around the electrode part 6a of the spark plug 6, and causing combustion at an overall very lean air/fuel ratio.

In the present embodiment, the above-mentioned stratified combustion is achieved in different spray transfer modes (different manners of transferring fuel spray) depending on the operational conditions of the internal combustion engine E. These spray transfer modes will be described below in detail.

Intake air flowing into the combustion chamber 4 through the intake ports 7 in the intake stroke is turned back upward by the cavity 2a of the piston 2 to form a tumbling flow. The tumbling flow formed continues also after the engine E proceeds to the compression stoke. When the internal combustion engine E operates with stratified combustion, the fuel spray injected by the fuel injection valve 5 in the compression stroke passes directly under the electrode part 6a of the spark plug 6 on its own kinetic energy, and then, within the cavity 2a of the piston 2 moving up, is turned back upward with the tumbling flow of intake air and arrives near the electrode part 6a of the spark plug 6 again.

Consequently, the fuel spray forms an ignitable mixture around the electrode part 2a to provide the opportunity of ignition, twice, namely at the timing that it passes directly under the electrode part 2a of the spark plug 2 immediately after injected, and then at the timing that it reaches the electrode part 2a again by being turned back by the piston cavity 2a with the tumbling flow. Stratified combustion in the spray transfer mode of the so-called spray-guide method (first spray transfer mode) is achieved by performing ignition at the former timing, and stratified combustion in the spray transfer mode of the so-called wall-guide method (second spray transfer mode) is achieved by performing ignition at the latter timing.

Figure 2:
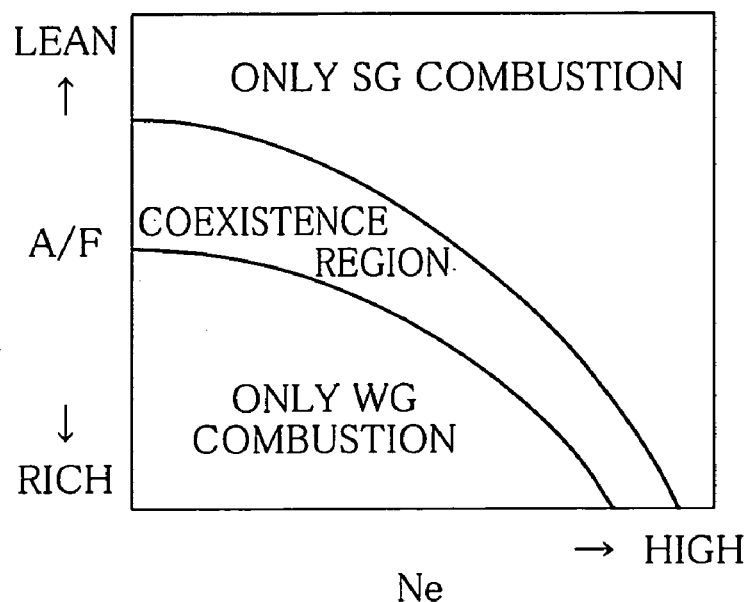
FIG. 2 is a characteristic diagram showing a region in which stratified combustion by the spray-guide method is practicable and a region in which stratified combustion by the wall-guide method is practicable.

The spray-guide method and the wall-guide method are different in the manner of transferring the fuel spray like this, and hence the fuel injection timing Tij and ignition timing Tig capable of achieving stratified combustion varies depending on the spray transfer mode. FIG. 2 shows, in respect of air/fuel ratio and revolving speed, the region in which stratified combustion in each spray transfer mode is practicable. As seen from FIG. 2, stratified combustion by the spray-guide method (hereinafter referred to as "SG combustion") is practicable in a region where the air/fuel ratio is relatively lean and the revolving speed is relatively high (hereinafter referred to as "SG region"). Meanwhile, stratified combustion by the wall-guide method (hereinafter referred to as "WG combustion") is practicable in a region where the air/fuel ratio is relatively rich and the revolving speed is relatively low (hereinafter referred to as "WG region"). Between both regions exists a coexistence region where stratified combustion is practicable in either spray transfer mode.

From the characteristics shown in FIG. 2, it can be expected that the WG combustion brings about good fuel economy and NOx suppression due to richer air/fuel ratios, chiefly in the low-revolving-speed high-torque operational region, and that the SG combustion brings about good fuel economy in the other operational regions. In operation with stratified combustion, the ECU 11 carries out a change between the spray transfer modes according to the control map shown in FIG. 3 to carry out the WG combustion chiefly in the low-revolving-speed high-torque operational region, and the SG combustion in the other operational regions.

Figure 3:
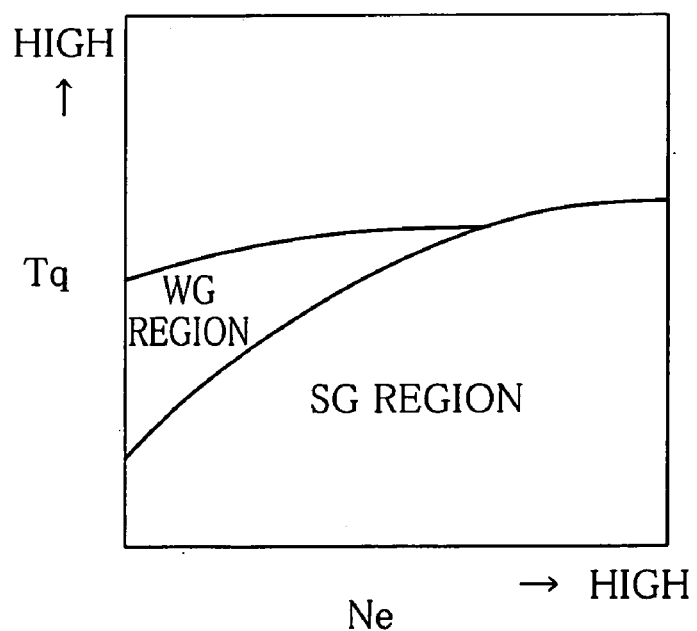
FIG. 3 is a control map defining a spray-guide operational region and a wall-guide operational region.
Figure 4:
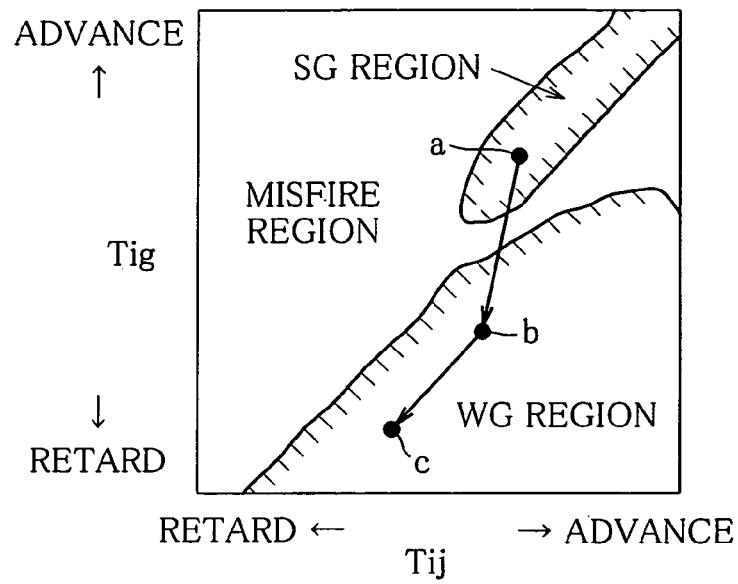
FIG. 4 is an explanatory diagram showing how the fuel injection timing and ignition timing are transferred from the SG region to the WG region when a change from the spray-guide method to the wall-guide method is carried out.

The change of the spray transfer mode based on the control map of FIG. 3 is carried out in the coexistence region shown in FIG. 2 where stratified combustion is practicable in either spray transfer mode. At any point within the coexistence region, stratified combustion is practicable in either spray transfer mode, but the fuel injection timing Tij and ignition timing Tig capable of achieving stratified combustion vary depending on the spray transfer mode. FIG. 4 is a characteristic diagram which relates to a certain air/fuel ratio within the coexistence region and shows, in respect of fuel injection timing Tij and ignition timing Tig, an SG region and a WG region. As seen from FIG. 4, the SG region and WG region are independent of each other, with a misfire region between.

It is to be noted that the characteristics shown in FIG. 4 are just an example, and that the area and shape of the SG region and of the WG region, positional relation between both regions, etc. vary depending on the air/fuel ratio. In some cases, the SG region and the WG region overlap. However, basically, at most air/fuel ratios, both regions are independent of each other.

When a spray transfer mode is changed within the coexistence region, the fuel injection timing Tji and ignition timing Tig are changed to transfer from the SG region to the WG region, or from the WG region to the SG region in FIG. 4. In fuel injection timing map control and ignition timing map control generally performed, in order to prevent a step in torque produced by the internal combustion engine E, the fuel injection timing Tji and ignition timing Tig are changed continuously, by performing interpolation to the control maps. In this technique, there are cases where the fuel injection timing Tji and ignition timing Tig stay long in the misfire region so that misfire continues. Thus, in the present embodiment, in order to avoid such situation, interpolation is stopped and measures against misfire are taken when the spray transfer mode is changed.

Figure 5:
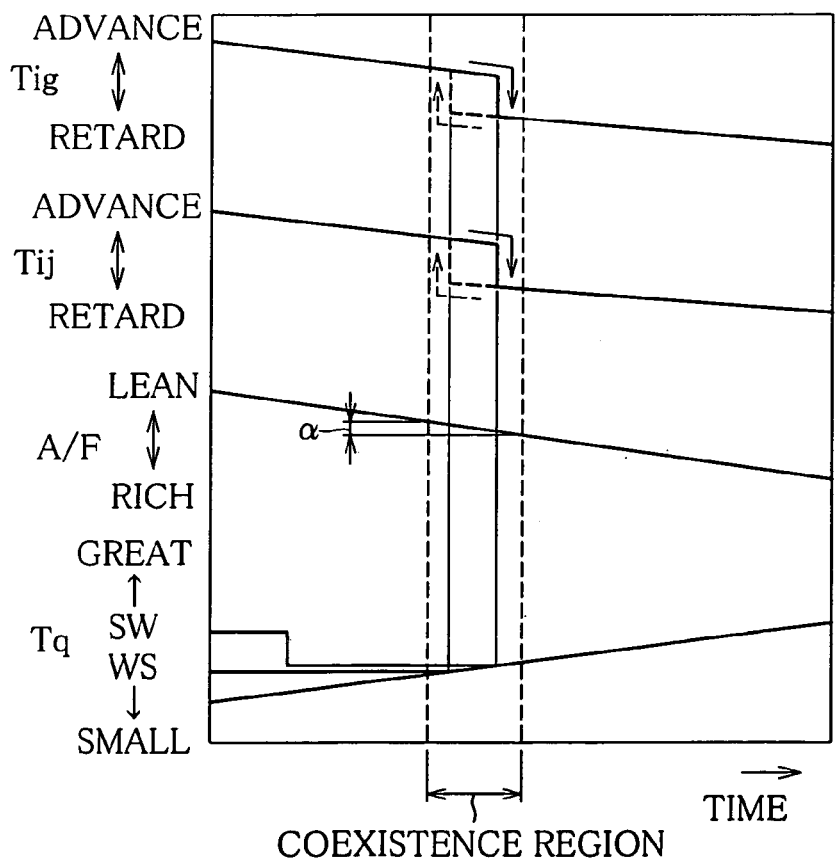
FIG. 5 is a time chart showing how control is performed when a change between the spray-guide method and the wall-guide method is carried out.
Figure 6:
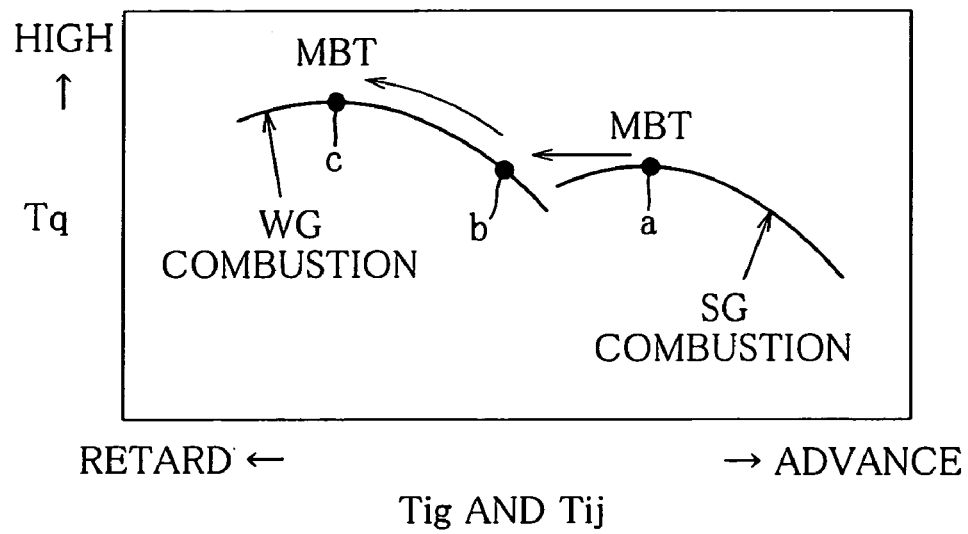
FIG. 6 is a diagram showing how torque changes when a change from the spray-guide method to the wall-guide method is carried out.

FIG. 5 is a time chart showing how control is performed when a change between the spray-guide method and the wall-guide method is carried out. FIG. 6 is an explanatory diagram showing how torque changes when a change from the spray-guide method to the wall-guide method is carried out.

For example, in operation with SG combustion, as the load on the internal combustion engine E increases, the target torque Tq is set to be greater, and in order to achieve the target torque Tq, the target air/fuel ratio (target A/F) is changed to be richer. In FIG. 5, reference sign a indicates the air/fuel ratio width of the above-mentioned coexistence region. A change of the spray transfer mode from the spray-guide method to the wall-guide method is carried out within the coexistence region. In the present embodiment, the timing of the change of the spray transfer mode is determined on the basis of the target torque Tq. When the target torque Tq exceeds an SW changeover torque (threshold) set within the coexistence region corresponding to the air/fuel ration width a in advance, the fuel injection timing Tij and ignition timing Tig are changed to a set of a fuel injection timing and an ignition timing capable of achieving the same target torque Tq, or, if the same target torque Tq is impossible, a torque closest to the target torque Tq (engine load: In the subsequent description, the expression "same target torque Tq" is used as including a torque closest to the target torque Tq) by the wall-guide method.

Here, the characteristics of the SG region and WG region (the area and shape of each region, the positional relation between both regions, etc.) as shown in FIG. 4 vary depending on the air/fuel ratio, and the change of the spray transfer mode is carried out on the basis of the regional characteristics at the air/fuel ratio corresponding to the SW changeover torque. It is ideal if the same target torque Tq as that before the change of the spray transfer mode is achieved after the change. Hence, the SW changeover torque is set to correspond to the air/fuel ratio at which the regional characteristics are optimal in respect of the possibility that a set of a fuel injection timing Tij and an ignition timing Tig capable of achieving the same target torque Tq exists. On the basis of the SW changeover torque thus set, the timing of the change of the spray transfer mode is determined (mode change determination means).

In the SG combustion before the change, the fuel injection timing Tij and ignition timing Tig are set to values corresponding to an MBT (minimum advance for the best torque) (optimal control point) which provides the best torque in the light of fuel economy, on the basis of the fuel injection timing map and ignition timing map. In FIG. 4, the fuel injection timing Tij and ignition timing Tig are controlled to be at point a within the SG region giving the MBT corresponding values. In FIG. 6, the fuel injection timing Tij and ignition timing Tig are controlled to be at point a on the SG combustion characteristic curve.

When the target torque Tq exceeds the SW changeover torque, a set of a fuel injection timing Tij and an ignition timing Tig capable of achieving the same target torque Tq by the wall-guide method is obtained from a conversion map prepared (injection timing and ignition timing calculation means). The conversion maps are prepared through the experiment in which the internal combustion engine E is actually made to operate with WG combustion at different air/fuel ratios to obtain the fuel injection timing Tij and ignition timing Tig which achieve each target torque Tq at each air/fuel ratio. Also the conversion maps for a change from the wall-guide method to the spray-guide method are prepared, and used when a change in the opposite direction is carried out (described later).

On the basis of the conversion maps, the fuel injection timing Tij and ignition timing Tig are changed stepwise from point a within the SG region to point b within the WG region, jumping across the misfire region, as shown in FIG. 4, and changed stepwise from point a on the SG combustion characteristic curve to point b on the WG combustion characteristic curve corresponding to the same target torque Tq, as shown in FIG. 6 (spray transfer mode change means). Thus, the continuation of misfire due to the fuel injection timing Tij and ignition timing Tig staying in the misfire region is prevented, and at the same time, a step in torque produced by the internal combustion engine E accompanying the change of the spray transfer mode is suppressed.

Since the change of the fuel injection timing Tij and ignition timing Tig is carried out on the basis of the regional characteristics at a specified air/fuel ratio (corresponding to the SW changeover torque) as shown in FIG. 4, the fuel injection timing Tij and ignition timing Tig are changed stepwise, necessarily keeping the same air/fuel ratio. Hence, the need to take measures to suppress an air/fuel ratio variation accompanying the change of the spray transfer mode, for example, control a throttle valve in parallel, can be obviated.

Then, MBT corresponding values (optimal control point) in WG combustion are obtained from the fuel injection timing map and ignition timing map, and the fuel injection timing Tij and ignition timing Tig after the change are continuously changed to the MBT corresponding values as target values. Specifically, in FIG. 4, the fuel injection timing Tij and ignition timing Tig linearly and continuously change to point c giving the MBT corresponding values within the WG region, and in FIG. 6, the fuel injection timing Tij and ignition timing Tig continuously change on the WG combustion characteristic curve toward point c giving the MBT corresponding values and reaches the MBT corresponding values, at which time the spray transfer mode change process is completed. As clear from FIG. 6, while the change of the fuel injection timing Tij and ignition timing Tig from point b to point c increases the torque, there is no risk of a torque step, since the fuel injection timing Tij and ignition timing Tig change continuously.

In a region in which the use of the MBT corresponding values causes knocking, values minimally corrected to suppress the knocking are obtained from the fuel injection timing map and ignition timing map as MBT corresponding values, and the fuel injection timing Tij and ignition timing Tig are controlled on the basis of these corrected values.

As stated above, when a change from the spray-guide method to the wall-guide method is carried out, a set of a fuel injection timing Tij and an ignition timing Tig capable of achieving the target torque Tq before the change, by the wall-guide method is obtained, and the fuel injection timing Tij and ignition timing Tig are stepwise changed to the obtained set. Thus, the change to the wall-guide method can be carried out, suppressing a torque step accompanying the change of the spray transfer mode and preventing continuation of misfire caused by the fuel injection timing Tij and ignition timing Tig staying in the misfire region.

A change from the wall-guide method to the spray-guide method is carried out by basically the same procedure as the above. Specifically, as shown in FIG. 5, in operation with WG combustion, as the load decreases, the target torque Tq is gradually decreased, and when the target torque Tq becomes lower than a WS changeover torque (threshold) for a change from the wall-guide method to the spray-guide method, the fuel injection timing Tij and ignition timing Tig are stepwise changed to the values capable of achieving the same target torque Tq by the spray-guide method.

Figure 7:
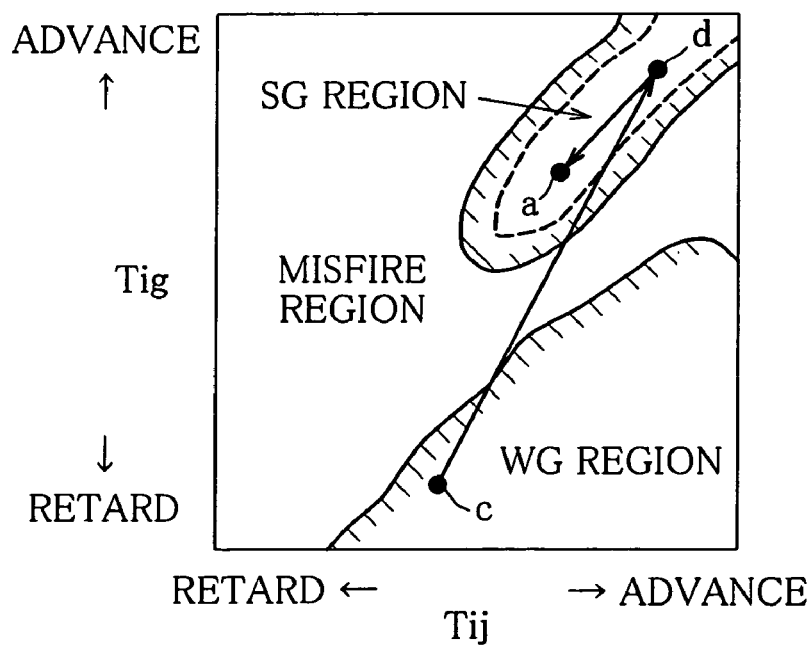
FIG. 7 is a diagram showing how the fuel injection timing and ignition timing are transferred from the WG region to the SG region when a change from the wall-guide method to the spay-guide method is carried out.

FIG. 7 is an explanatory diagram showing how the fuel injection timing Tij and ignition timing Tig are changed from point c in the WG region to point a in the SG region, in the direction opposite to that in the case of FIG. 4, when a change from the wall-guide method to the spray-guide method is carried out. First, on the basis of the target torque Tq achieved at point c within the WG region, point d giving a set of a fuel injection timing Tij and an ignition timing Tig capable of achieving the same target torque Tq by the spray-guide method is obtained from the conversion map. The fuel injection timing Tij and ignition timing Tig are changed stepwise from point c to point d within the SG region, jumping across the misfire region, and then continuously changed to point a giving MBT corresponding values within the SG region. Thus, like the change from the spray-guide method to the wall-guide method described above, the change to the wall-guide method can be carried out, suppressing a torque step accompanying the change of the spray transfer mode and preventing the continuation of misfire caused by the fuel injection timing Tij and ignition timing Tig staying in the misfire region.

Consequently, in the present embodiment, a change between the spray-guide method and wall-guide method can be carried out without a concern about a torque step and misfire, which makes it possible to carry out stratified combustion in a spray transfer mode optimal for the present operational conditions in the light of fuel economy, NOx emission, etc., and fully utilize the merits of each spray transfer mode.

Like the SW changeover torque, the WS changeover torque is set to a value corresponding to the air/fuel ratio at which the regional characteristics are optimal to achieve the same target torque Tq. Taking account of this condition, the WS changeover torque is necessarily set to a lower value (corresponding to a leaner air/fuel ratio) than the SW changeover torque. The setting of the WS changeover torque will be described below.

As clear from the characteristics shown in FIGS. 4 and 7, within the coexistence region, the SG region is much smaller in area than the WG region, which means that the range of fuel injection timings Tij and ignition timings Tig capable of achieving SG combustion is fairly narrow. This tendency is based on the fact that while the period in which fuel spray injected by the fuel injection valve 5 and passing directly under the electrode part 6a of the spark plug 6 can be ignited is very short, the period in which fuel spray reaching the electrode part 6a again with the tumbling flow can be ignited is long, since it has already diffused to some degree.

Due to this difference in area between the SG region and the WG region, there is a possibility that at the same air/fuel ratio, for the transfer from the WG region to the SG region, no set of a fuel injection timing Tij and an ignition timing Tig capable of achieving the same target torque Tq is found, while for the transfer from the SG region to the WG region, a set of a fuel injection timing Tij and an ignition timing Tig capable of achieving the same target torque Tq is found. Thus, compared with the WG region, in the SG region, the probability to obtain a set of a fuel injection timing Tij and an ignition timing Tig capable of achieving the same target torque Tq is lower, which can cause a torque step.

The regional characteristics of the SG region and WG region (the area and shape of each region, the positional relation between both regions, etc.) as shown in FIGS. 4 and 7 vary depending on the air/fuel ratio. The overall tendency is such that as the air/fuel ratio is richer within the coexistence region, WG combustion is easier to achieve and the WG region is greater, and that as the air/fuel ratio is leaner within the coexistence region, SG combustion is easier to achieve and the SG region is greater. Taking account of this tendency, the WS changeover torque is set to a lower value (corresponding to a leaner air/fuel ratio) than the SW changeover torque.

Thus, in the regional characteristics shown in FIG. 7 corresponding to the WS changeover torque, the SG region is greater compared with the SG region in FIG. 4 (indicated in broken line in FIG. 7)(and conversely, the WG region is smaller). Hence, when the change from the wall-guide method to the spray-guide method is carried out, the probability to obtain a set of a fuel injection timing Tij and an ignition timing Tig capable of achieving the same target torque Tq in the SG region is higher, and even if such set is not found, the probability to obtain a set of a fuel injection timing Tij and an ignition timing Tig capable of achieving a torque closer to the target torque Tq is higher. Consequently, the change to the spray-guide method can be completed without a torque step.

Depending on the regional characteristics as shown in FIGS. 4 and 7, more than one set of a fuel injection timing Tij and an ignition timing Tig capable of achieving the same target torque Tq in the spray transfer mode after the change can exist. In such case, from among those candidate sets, a set of a fuel injection timing Tij and an ignition timing Tig closest to the MBT corresponding values in the spray transfer mode after the change is selected on the basis of the conversion map, and the fuel injection timing Tij and ignition timing Tig are stepwise changed to the selected set.

Consequently, the fuel injection timing Tij and ignition timing Tig are changed to a point close to the MBT corresponding values, and then reach the MBT corresponding values through the shortest distance. This makes the period in which the fuel injection timing Tij and ignition timing Tig are off the MBT corresponding values due to the change of the spray transfer mode very short and can reduce the deterioration of combustion in this period to a minimum.

In the case where no set of a fuel injection timing Tij and an ignition timing Tig capable of achieving the same target torque Tq exists but a plurality of candidate sets capable of achieving a torque close to the same target torque Tq exist, a candidate which is best in the light of a torque step and burning conditions is selected, on the basis of the conversion map. More specifically, taking account of the suppression of a torque step brought about when a candidate capable of achieving a torque close to the same target torque Tq is selected, and the suppression of combustion deterioration brought about when a candidate close to the MBT corresponding values is selected, a candidate that can satisfy both requirements to the maximum is set in the conversion map in advance, and the fuel injection timing Tij and ignition timing Tig are stepwise changed to that candidate. Consequently, also in this case, suppression of a torque step and prevention of misfire can be both achieved.

The above is the description of one embodiment of the present invention. The present invention is, however, not limited to the above-described embodiment. For example, in the above embodiment, the engine is formed as an in-line four-cylinder internal combustion engine E. However, the arrangement or number of cylinders of the internal combustion engine E is not limited but can be modified in any way, as long as it allows direct injection of fuel into the combustion chamber 4 and a change between different spray transfer modes.

Further, in the described embodiment, the timing of the change of the spray transfer mode is determined on the basis of the target torque Tq. However, as clear from the description of the embodiment, since the target torque Tq correlates with the air/fuel ratio, the timing of the change can be determined on the basis of the air/fuel ratio in place of the target torque Tq.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-cylinder injection type spark-ignition internal combustion engine comprising:
    a fuel injection valve for injecting fuel directly into a combustion chamber;
    a spark plug with an electrode part located near a path of fuel spray injected by the fuel injection valve;
    a piston arranged to be able to turn back the fuel spray which has passed by the electrode part of the spark plug so that the fuel spray is transferred again to near the electrode part;
    a mode change determination means for determining whether to carry out a change between stratified combustion in a first spray transfer mode in which ignition is made at the time when the fuel spray injected by the fuel injection valve passes by the electrode part of the spark plug, and stratified combustion in a second spray transfer mode in which ignition is made at the time when the fuel spray which has passed by the electrode part is transferred again to near the electrode part by the piston turning the fuel spray back, in a coexistence operational region where stratified combustion in the first spray transfer mode and stratified combustion in the second spray transfer mode are both practicable;

an injection timing and ignition timing calculation means for, when the mode change determination means determines to change the spray transfer mode, calculating a set of a fuel injection timing and an ignition timing capable of achieving almost the same engine torque as a torque produced by the internal combustion engine before the change, by stratified combustion in the spray transfer mode after the change; and a spray transfer mode change means for, when the mode change determination means determines to change the spray transfer mode, stepwise changing the fuel injection timing and ignition timing for the Internal combustion engine, on the basis of the result of calculation by the injection timing and ignition timing calculation means.

2. The in-cylinder injection type spark-ignition internal combustion engine according to claim 1, wherein:

the injection timing and ignition timing calculation means calculates a set of a fuel injection timing and an ignition timing capable of achieving almost the same engine torque as an engine torque before the change, by stratified combustion in the spray transfer mode after the change, at the same air/fuel ratio as an air/fuel ratio before the change; and the spray transfer mode change means stepwise changes the fuel injection timing and ignition timing, keeping the same air/fuel ratio.

3. The in-cylinder injection type spark-ignition internal combustion engine according to claim 1, wherein:

when a plurality of sets of a fuel injection timing and an ignition timing capable of achieving almost the same engine torque as an engine torque before the change are calculated by the injection timing and ignition timing calculation means, the spray transfer mode change means selects a set of a fuel injection timing and a ignition timing closest to an optimal control point in the spray transfer mode after the change in the light of fuel economy and torque, and changes the fuel injection timing and ignition timing stepwise to the selected set.

4. The in-cylinder injection type spark-ignition internal combustion engine according to claim 1, wherein:

the spray transfer mode change means changes the fuel injection timing and ignition timing stepwise, and then changes the fuel injection timing and ignition timing continuously to an optimal control point in the spray transfer mode after the change in the light of fuel economy and torque.

5. The in-cylinder injection type spark-ignition internal combustion engine according to claim 1, wherein:

the mode change determination means determines whether to carry out a change from the second spray transfer mode to the first spray transfer mode on the basis of a threshold set at a lower load or a leaner air/fuel ratio, compared with a threshold for determining whether to carry out a change from the first spray transfer mode to the second spray transfer mode.

* * * * *